US009754719B2

United States Patent
Ohshima et al.

(10) Patent No.: US 9,754,719 B2
(45) Date of Patent: Sep. 5, 2017

(54) CUTTING METHOD AND CUTTING DEVICE OF MANUFACTURING MAGNET PIECE FORMING MAGNET BODY FOR FIELD POLE TO BE ARRANGED IN ROTATING ELECTRIC MACHINE

(71) Applicant: NISSAN MOTOR CO., LTD., Yokohama-shi, Kanagawa (JP)

(72) Inventors: Takumi Ohshima, Kanagawa (JP); Kiyoshi Hasegawa, Kanagawa (JP); Kimio Nishimura, Kanagawa (JP); Takashi Sekikawa, Kanagawa (JP); Yasushi Matsushita, Kanagawa (JP); Akihisa Hori, Kanagawa (JP); Michito Kishi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/911,682

(22) PCT Filed: Aug. 21, 2014

(86) PCT No.: PCT/JP2014/071932
§ 371 (c)(1),
(2) Date: Feb. 11, 2016

(87) PCT Pub. No.: WO2015/029882
PCT Pub. Date: Mar. 5, 2015

(65) Prior Publication Data
US 2016/0211073 A1    Jul. 21, 2016

(30) Foreign Application Priority Data

Aug. 29, 2013    (JP) ................................. 2013-177831

(51) Int. Cl.
*B26F 3/00* (2006.01)
*H02K 15/03* (2006.01)
(Continued)

(52) U.S. Cl.
CPC ..... *H01F 41/0253* (2013.01); *B23K 26/0006* (2013.01); *B23K 26/0087* (2013.01);
(Continued)

(58) Field of Classification Search
CPC .............. H01F 41/0253; B23K 26/359; B23K 26/0006; B23K 26/0087; B23K 2203/50; B26F 3/002; H02K 1/276; H02K 15/03
(Continued)

(56) References Cited

U.S. PATENT DOCUMENTS 8,497,613 B2    7/2013 Nakamura et al.
8,747,583 B2 *  6/2014 Takaichi ............. H01F 41/0253
                                                   156/580
(Continued)

FOREIGN PATENT DOCUMENTS

EP    2255939 A2    12/2010
EP    2573916 A1    3/2013
(Continued)

*Primary Examiner* — Omar Flores Sanchez
(74) *Attorney, Agent, or Firm* — Young Basile Hanlon & MacFarlane, P.C.

(57) ABSTRACT

A cutting method and a cutting device of cutting a magnet body including a coating film feed, in a state where the magnet body in which cutout grooves serving as brittle sections are provided on a lower surface along cutting planned positions is supported by dies serving as two support points from the lower side, the magnet body to a position where the brittle section is arranged between both the support points, and press the magnet body from the upper side of a position offset rearward in the feeding direction from the brittle section between both the support (Continued)

points, so as to cut the magnet body into a cut magnet body and a magnet piece smaller than the cut magnet body while cutting the coating film.

11 Claims, 13 Drawing Sheets

(51) Int. Cl.
*H01F 41/02* (2006.01)
*H02K 1/27* (2006.01)
*B23K 26/359* (2014.01)
*B23K 26/00* (2014.01)
*B23K 103/00* (2006.01)

(52) U.S. Cl.
CPC ........... *B23K 26/359* (2015.10); *H02K 1/276* (2013.01); *H02K 15/03* (2013.01); *B23K 2203/50* (2015.10)

(58) Field of Classification Search
USPC .................................... 225/104, 103, 106, 2
See application file for complete search history.

(56) References Cited

U.S. PATENT DOCUMENTS

| | | | |
|---|---|---|---|
| 8,819,921 B2* | 9/2014 | Adachi | ................ H01F 7/0221 |
| | | | 29/417 |
| 2010/0244608 A1 | 9/2010 | Nakamura et al. | |
| 2014/0013582 A1* | 1/2014 | Fubuki | ................... B26F 3/002 |
| | | | 29/598 |
| 2014/0231483 A1 | 8/2014 | Takaichi et al. | |

FOREIGN PATENT DOCUMENTS

| | | |
|---|---|---|
| JP | 919918 A | 1/1997 |
| JP | 10170880 A | 6/1998 |
| JP | 2000-324736 A | 11/2000 |
| JP | 2009-142081 A | 6/2009 |
| JP | 2010274573 A | 12/2010 |
| WO | 2013-047298 A1 | 4/2013 |

* cited by examiner

CUTTING METHOD AND CUTTING DEVICE OF MANUFACTURING MAGNET PIECE FORMING MAGNET BODY FOR FIELD POLE TO BE ARRANGED IN ROTATING ELECTRIC MACHINE

CROSS REFERENCE TO RELATED APPLICATION

The present application claims priority to Japanese Patent Application No. 2013-177831, filed on Aug. 29, 2013, the entire content of which is herein incorporated by reference.

TECHNICAL FIELD

The present invention relates to a cutting method and a cutting device of manufacturing a magnet piece forming a magnet body for field pole to be arranged in a rotating electric machine.

BACKGROUND

As a magnet body for field pole to be arranged in a rotating electric machine, a magnet body for field pole formed by cutting a plate shape magnet body (hereinafter, simply referred to as the "magnet body") into a plurality of magnet pieces and bonding the plurality of magnet pieces to each other is conventionally known. Since such a magnet body for field pole is formed by the plurality of magnet pieces, the volume of an individual magnet piece can be reduced, so that an overcurrent generated in the magnet piece by a change in a magnetic field due to rotation of a rotor can be reduced. Thereby, heat generation of the magnet body for field pole following the generation of the overcurrent is suppressed, so that irreversible thermal demagnetization can be prevented.

JP2009-142081A discloses that by mounting a magnet body in which cutouts are provided along cutting planned lines onto a die supporting the magnet body in both end parts in the direction perpendicular to the cutting planned lines and squeezing in upper parts of the cutting planned lines downward by a blade, the magnet body is cut along the cutting planned lines and a plurality of magnet pieces is manufactured.

The magnet body is fed in the longitudinal direction on the die, and a leading end part in the feeding direction is successively cut by the blade one by one. The magnet body is cut by squeezing in the blade downward from the upper parts of the cutting planned lines in a state where the magnet body is supported by the die on both sides of the cutting planned lines. That is, the magnet body is cut by three-point bending.

Since the magnet body is susceptible to rust, a surface of the magnet body is coated with a material having an anti-rust effect. This coating film material is a ductile material. Thus, there is sometimes a case where at the time of cutting the magnet body, the coating film is not drawn out enough to be cut in parts of the cutting planned lines, so that the coating film is not cut. In a case where the coating film is not cut, the cut magnet piece and the pre-cut magnet body are coupled to each other by the coating film. As a result, a disadvantage that at the time of conveying the cut magnet piece to the following step, the pre-cut magnet body is conveyed at the same time is subsequently generated.

SUMMARY

The present invention is achieved in consideration with the above problem, and an object thereof is to provide a cutting method and a cutting device favorable for manufacturing a magnet piece forming a magnet body for field pole to be arranged in a rotating electric machine by cutting a magnet body including a coating film.

According to one embodiment of this invention, a cutting method of manufacturing a magnet piece forming a magnet body for field pole to be arranged in a rotating electric machine by cutting a permanent magnet body, comprising: forming a brittle section on at least one surface of the permanent magnet body including a deterioration preventive coating film on a surface at a cutting planned position extending in the width direction of the magnet body; in a state where the magnet body having the brittle section being placed on the lower surface side is supported at two support points from the lower side, feeding the magnet body to a position where the brittle section is arranged between both the support points; and cutting the magnet body into a cut magnet body and a magnet piece smaller than the cut magnet body including the coating film by pressing the magnet body from the upper side of a position offset rearward in the feeding direction from the brittle section between both the support points.

DETAILED DESCRIPTION OF THE EMBODIMENTS

Hereinafter, an embodiment of the present invention will be described with reference to the attached drawings.

Figure 1A:
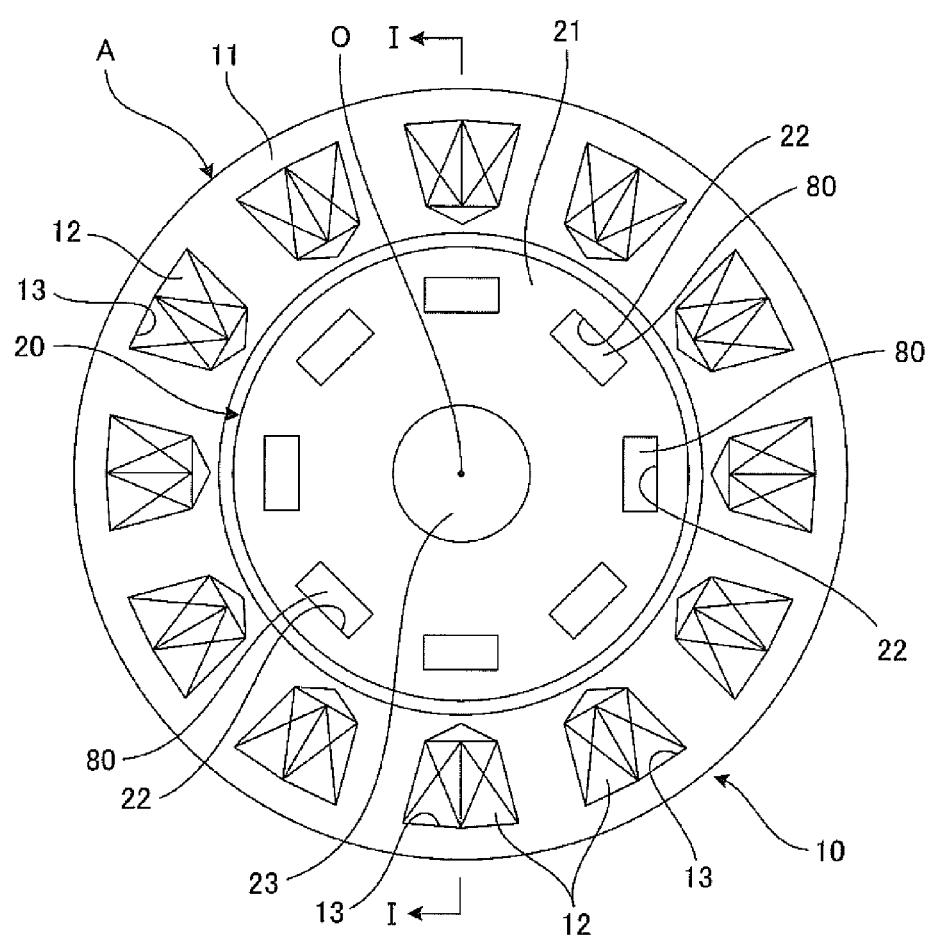
FIG. 1A is a schematic configuration diagram showing a configuration of major parts of a permanent magnet type rotating electric machine in which magnet bodies for field pole formed by magnet pieces which are manufactured by a cutting method and a cutting device according to the present embodiment are applied.
Figure 1B:
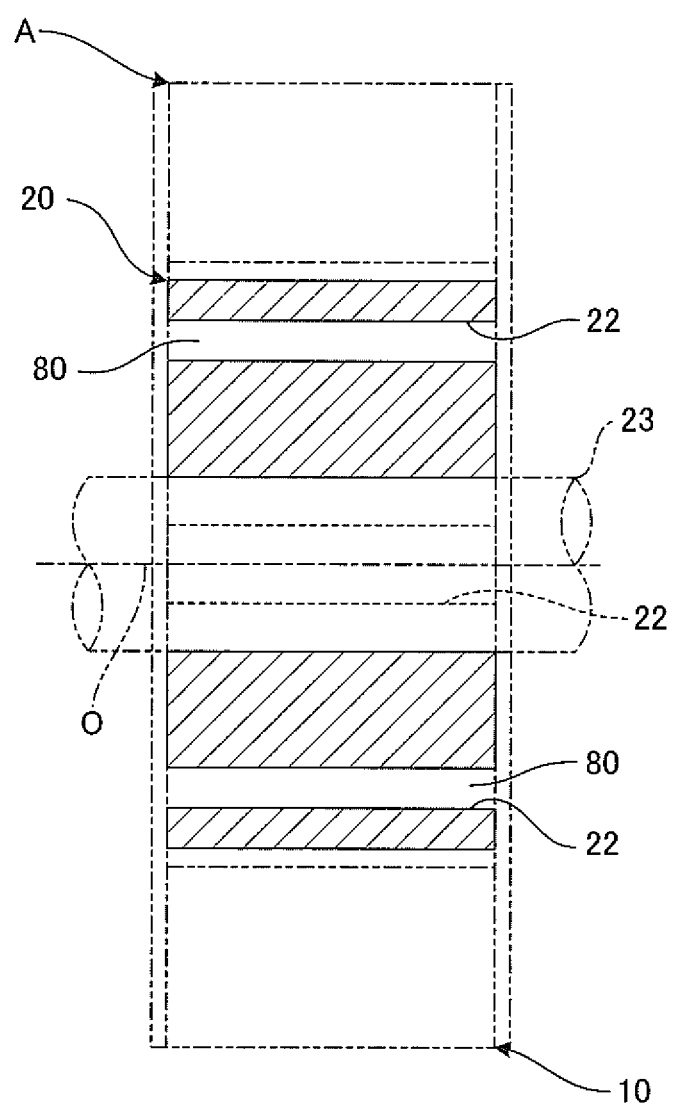
FIG. 1B is a sectional view showing a section taken along the line I-I of the permanent magnet type rotating electric machine of FIG. 1A.

FIG. 1A and FIG. 1B showing a section taken along the line I-I of FIG. 1A show a permanent magnet embedded type rotating electric machine A to which magnet bodies for field pole 80 formed by magnet pieces which are manufactured by a cutting method and a cutting device according to the present embodiment are applied (hereinafter, simply referred to as the "rotating electric machine A").

The rotating electric machine A is formed by an annular stator 10 forming a part of a casing, and a columnar rotor 20 arranged coaxially to this stator 10.

The stator 10 is formed by a stator core 11, and a plurality of coils 12. The plurality of coils 12 is housed in slots 13 formed at equal angle intervals on the same circumference around axial center O in the stator core 11.

The rotor 20 is formed by a rotor core 21, a rotation shaft 23 to be rotated integrally with the rotor core 21, and the plurality of magnet bodies for field pole 80. The plurality of magnet bodies for field pole 80 is housed in slots 22 formed at equal angle intervals on the same circumference around the axial center O.

Figure 2:
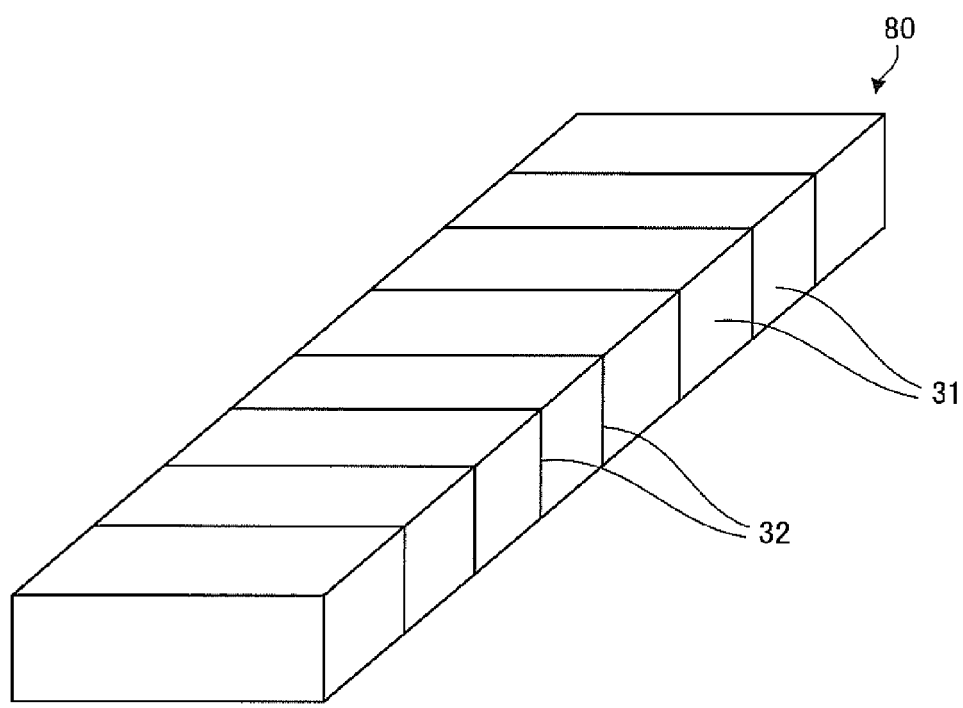
FIG. 2 is a configuration diagram showing a configuration of the magnet body for field pole.

As shown in FIG. 2, each of the magnet bodies for field pole 80 housed in the slots 22 of the rotor 20 is formed as a collective body of magnet pieces 31 in which the plurality of magnet pieces 31 is aligned in a line. Each of the magnet pieces 31 is divided by cutting a plate shape magnet body 30 whose entire circumferential surface is covered with a coating film having an anti-rust effect, the magnet body having upper and lower surfaces of an oblong shape, along the short direction of the oblong shape. The magnet body for field pole 80 is formed by bonding cut surfaces of the plurality of divided magnet pieces 31 to each other with resin 32. For example, resin having a performance of resisting heat of about 200° C. is used as the resin 32, and electrically insulates the adjacent magnet pieces 31. Thereby, an overcurrent generated in the magnet piece 31 by a change in an acting magnetic field is reduced by keeping the overcurrent in the individual magnet piece 31, and heat generation of the magnet body for field pole 80 following the overcurrent is suppressed, so that irreversible thermal demagnetization can be prevented.

Next, with reference to FIGS. 3A to 3C, a process of manufacturing the plurality of magnet pieces 31 from the plate shape magnet body 30 whose entire circumferential surface is covered with a coating film 35 having the anti-rust effect will be described.

Figure 3A:
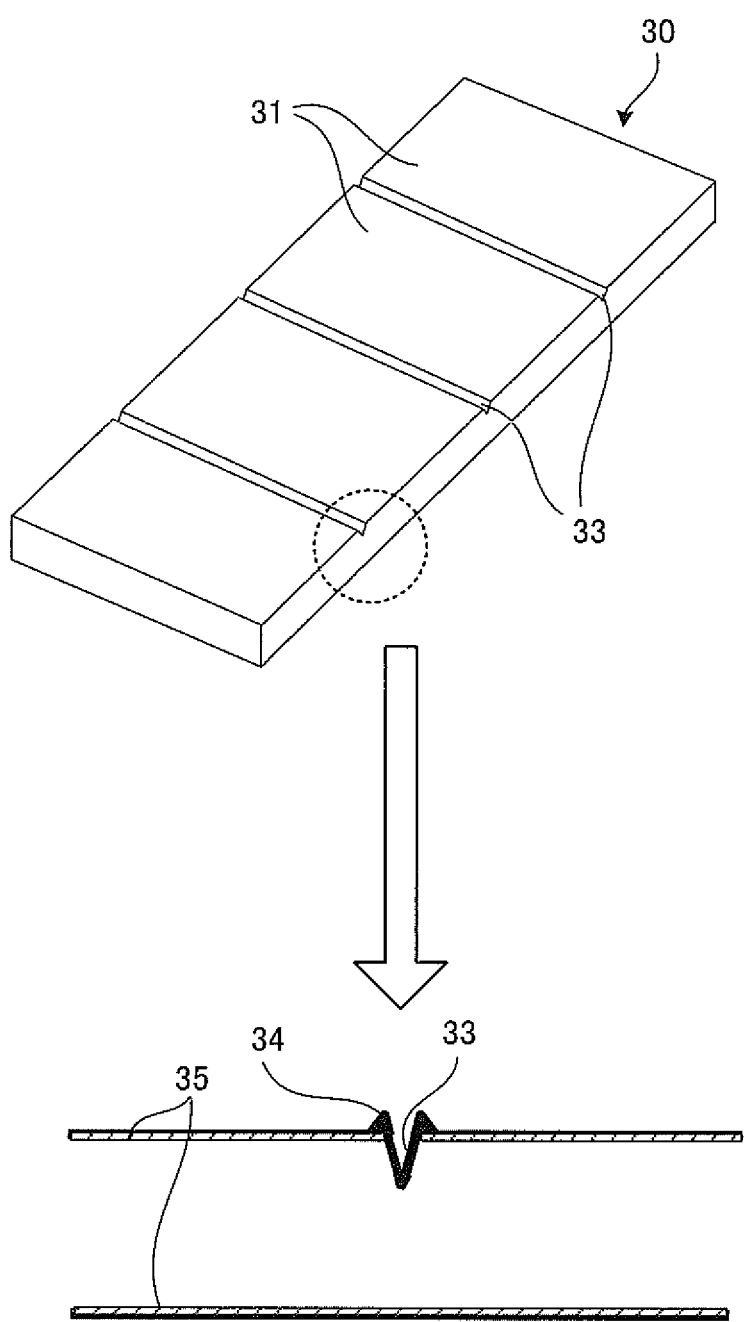
FIG. 3A is a view for illustrating a groove making step of the magnet body.
Figure 3B:
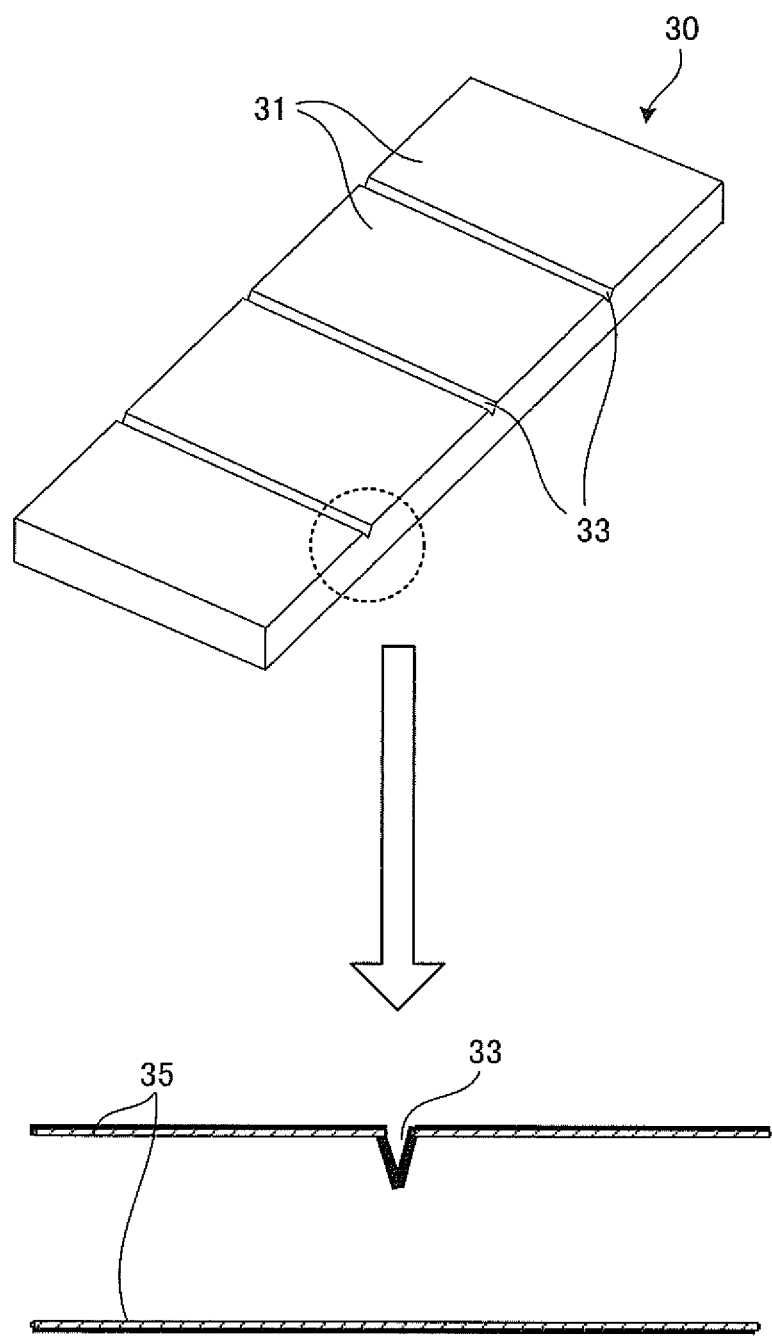
FIG. 3B is a view for illustrating a deburring step of the magnet body.

In order to cut the magnet body 30 into the plurality of magnet pieces 31, it is effective to preliminarily form brittle sections including cutout grooves 33 or the like in parts of the magnet body 30 to be cut (cutting planed lines) as shown in FIG. 3A. Regarding the cutout grooves 33 provided as the brittle sections, the more depth from surfaces are, and the sharper leading ends of the cutout grooves 33 are, the more flatness of the cut surfaces in a case of cutting as the magnet pieces 31 is improved.

A formation method of the cutout grooves 33 includes a method of providing the cutout grooves in a molding step of the magnet body 30 by protrusions for forming grooves provided in a mold of the magnet body 30, a method by mechanical processing with a dicer, a slicer, or the like, a method by laser beam irradiation, and wire cut electric discharge machining. In a case where the cutout grooves 33 are formed by the mechanical processing, the laser beam irradiation, and the wire cut electric discharge machining, the coating film 35 on the surface of the magnet body 30 is also cut out at the same time.

In a case where the cutout grooves 33 are formed by the laser beam irradiation and the wire cut electric discharge machining, burrs 34 are generated along the cutout grooves 33. Thus, the burrs 34 are removed in a deburring step as shown in FIG. 3B.

Figure 3C:
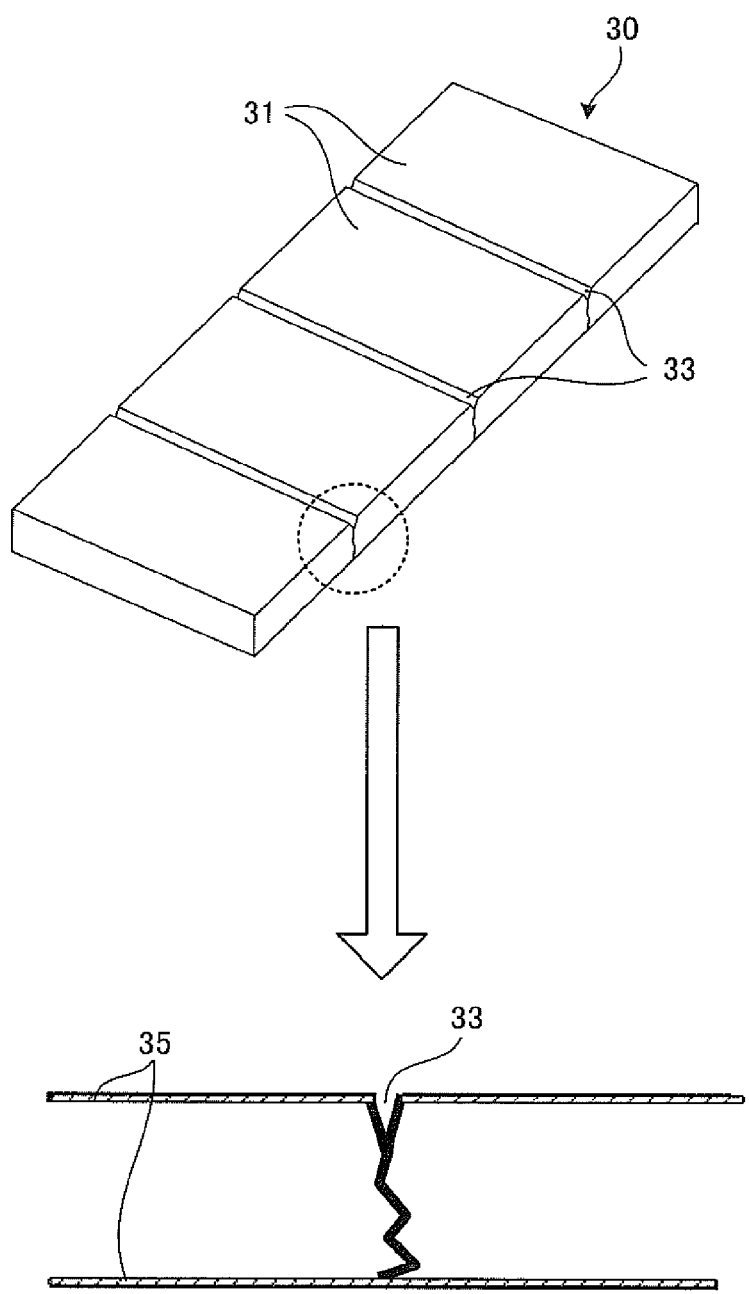
FIG. 3C is a view for illustrating a cutting step of the magnet body.

Successively, in a cutting step, by pressing, in a state where the cutout grooves 33 are placed to face the lower side, positions corresponding to the grooves 33 from the side where the cutout grooves 33 are not formed by a blade serving as a cutting device/means to be described later, the magnet body 30 is cut along the cutout grooves 33 into the plurality of magnet pieces 31 as shown in FIG. 3C.

Figure 4A:
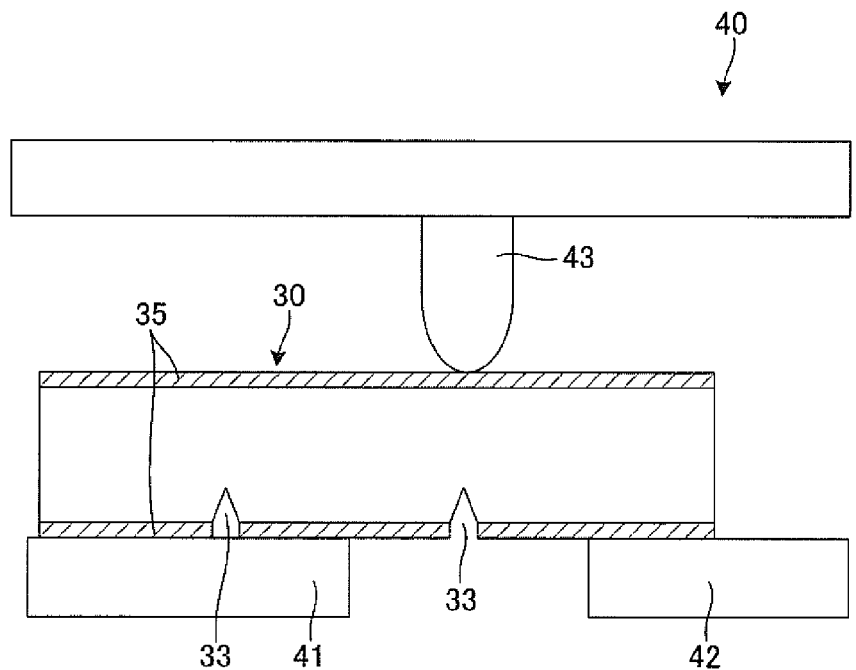
FIG. 4A is a view showing a cutting step of the cutting device as a comparative example 1.
Figure 4B:
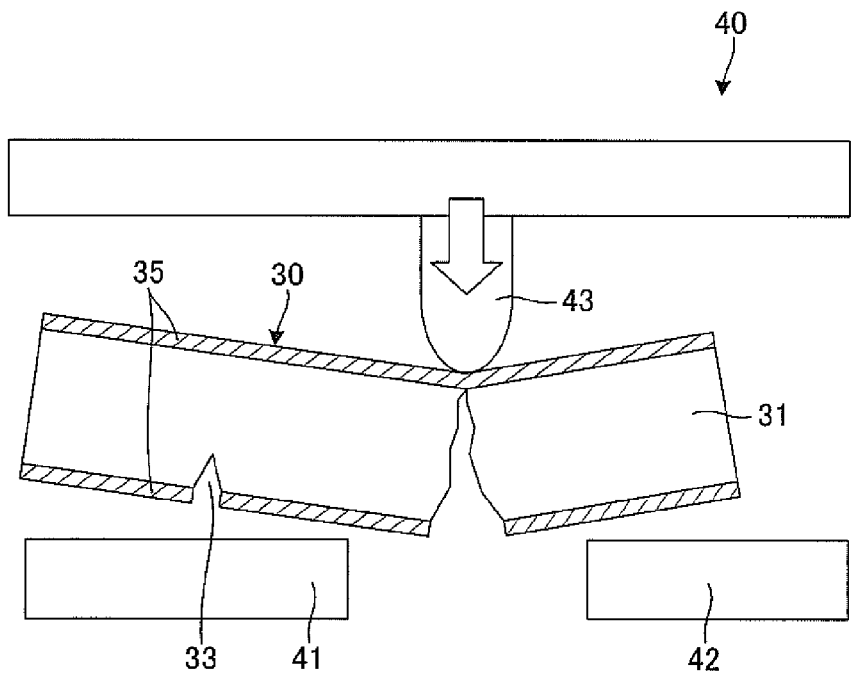
FIG. 4B is a view showing the cutting step of the cutting device as the comparative example 1.

FIGS. 4A and 4B show an outline of a cutting device 40 serving as a comparative example 1 in which the cutting step shown in FIG. 3C is performed.

The cutting device 40 is a device in which the magnet body 30 is mounted in a state where the magnet body is suspended between a pair of dies 41, 42, a blade 43 is lowered to the suspended part from the upper side, and the magnet body 30 is cut by three-point bending. The cutting device 40 includes the pair of dies 41, 42 serving as a lower die on which the magnet body 30 is suspended and mounted, the blade 43 adapted to cut the magnet body 30 by squeezing in the suspended part of the magnet body 30, and a magnet conveyance device (not shown) adapted to feed the magnet body 30 to a part immediately below the blade 43 from one end part (FIG. 4A).

The blade 43 cuts the magnet body 30 by pressing an upper surface of the magnet body 30 suspended over the pair of dies 41, 42 downward. The blade 43 is positioned in such a manner that a leading end is placed in the middle between the pair of dies 41, 42, and driven by for example servo press, mechanical press, hydraulic press, or the like.

The cutting device 40 is formed as described above, and the magnet body 30 including the cutout grooves 33 are provided is suspended and mounted on upper surfaces of the pair of dies 41, 42. It should be noted that the magnet body 30 is mounted on the pair of dies 41, 42 in such a manner that the cutout groove 33 preliminarily provided at a desired cutting position, that is, on the cutting planned line is placed to face the dies 41, 42.

In a state where the blade is positioned in such a manner that the cutout groove 33 serving as the cutting planned line is placed in the middle between the pair of dies 41, 42 by the magnet conveyance device (not shown), the blade 43 is lowered. When the blade 43 is lowered, the blade 43 presses a back part of the cutout groove 33 downward, and the magnet body 30 is cut along the cutout groove 33 by three-point bending of the blade 43 and adjacent edge sections 41a, 42a of the pair of dies 41, 42 (FIG. 4B).

At this time, the coating film 35 covering the surface of the magnet body 30 is cut on the side of a side surface of the magnet body 30 in accordance with progress of the cut surfaces generated by the cutout groove 33 but not cut on the side of the upper surface of the magnet body 30 with which the blade 43 is abutted. That is, the cut magnet piece 31 and the pre-cut magnet body 30 are coupled to each other by the uncut coating film 35 on the side of the upper surface.

This is thought to be because the coating film 35 is made of a ductile material, and because at the time of cutting the magnet body 30, the coating film 35 on the side of the upper surface of the magnet body 30 is abutted with the blade 43 in the part of the cutting planned line, pressed downward, and just bent. Therefore, generation of tensile force to separate the cut coating film 35 on the side of the upper surface of the magnet piece 31 and the uncut coating film 35 remains weak, so that the coating film 35 is not drawn out enough to be cut and hence not cut.

Figure 5A:
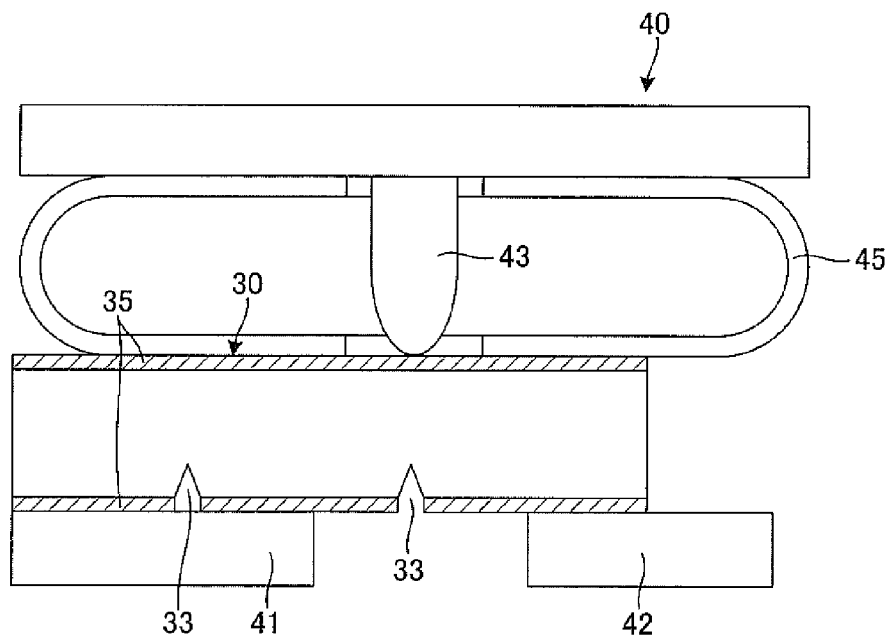
FIG. 5A is a view showing a cutting step of the cutting device as a comparative example 2.
Figure 5B:
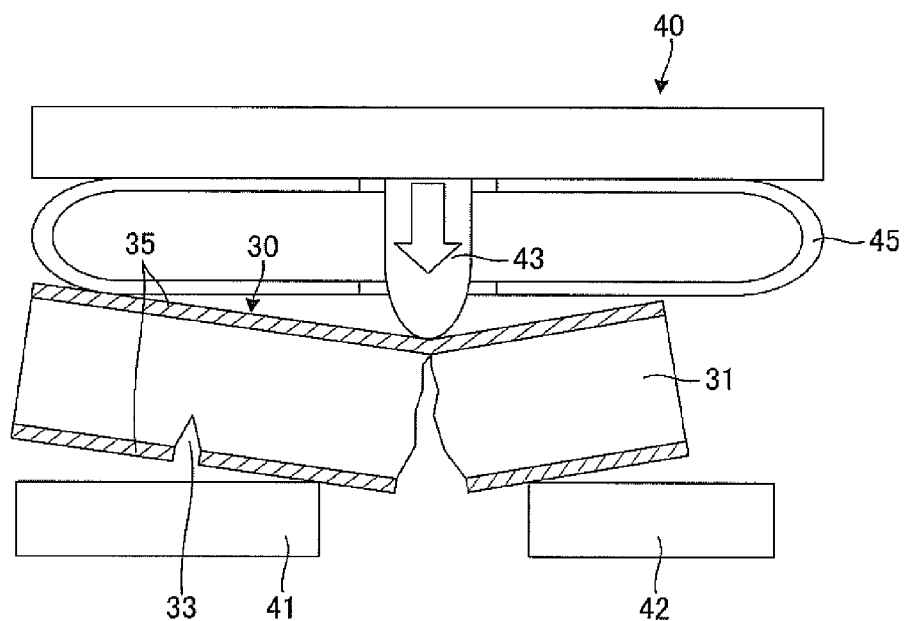
FIG. 5B is a view showing the cutting step of the cutting device as the comparative example 2.
Figure 5C:
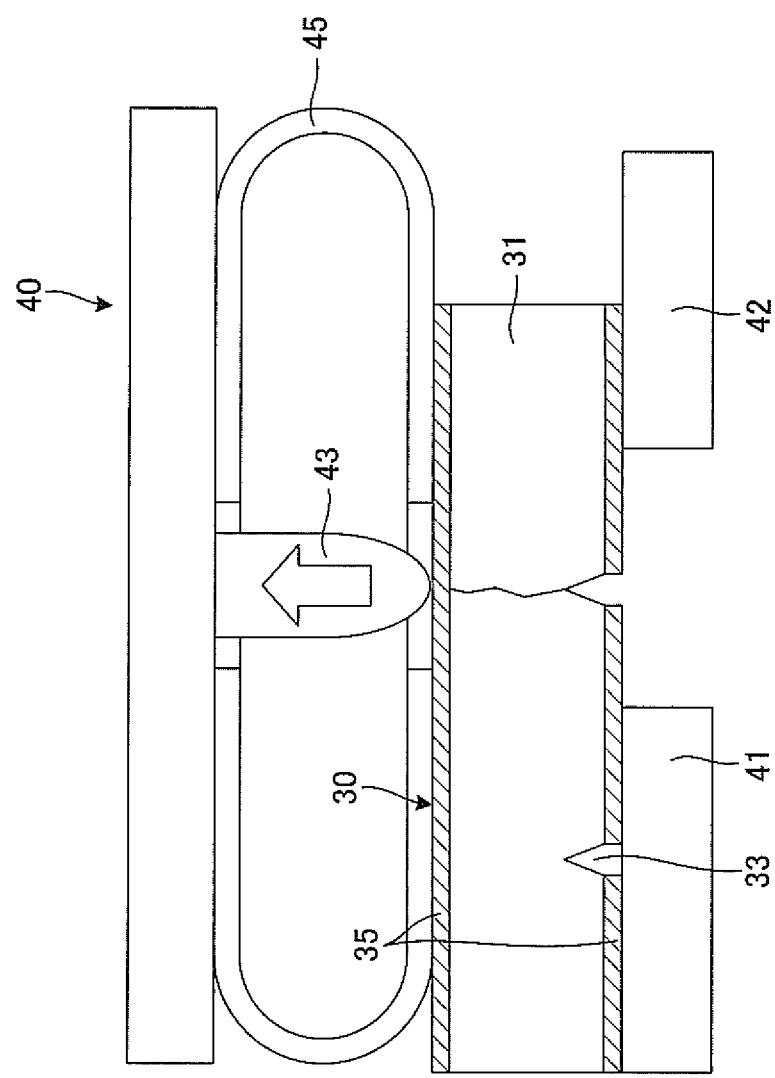
FIG. 5C is a view showing the cutting step of the cutting device as the comparative example 2.

The above problem becomes more remarkable in a cutting device 40 of a comparative example 2 in which movement of the magnet piece 31 is suppressed by pressing a magnet holder 45 onto the magnet body 30 and scatter of the magnet piece 31 is prevented by stress release at the moment of cutting as shown in FIGS. 5A to 5C. That is, the cutting device 40 of the comparative example 2 includes the magnet holder 45 to be moved up and down together with the blade 43 in addition to the cutting device 40 of the comparative example 1.

In a state where the blade is positioned in such a manner that the cutout groove 33 serving as the cutting planned line is placed in the middle between the pair of dies 41, 42 by the magnet conveyance device (not shown), the blade 43 is lowered. Following lowering of the blade 43, firstly, the magnet holder 45 is brought into contact with the upper surface of the magnet body 30 to suppress movement of the magnet body 30 (FIG. 5A). Further, when the blade 43 is lowered, the blade 43 presses the back part of the cutout groove 33 downward, and the magnet body 30 is cut along the cutout groove 33 by three-point bending of the blade 43 and the adjacent edge sections 41a, 42a of the pair of dies 41, 42 (FIG. 5B).

At this time, the coating film 35 on the side of the upper surface of the magnet body 30 is abutted with the blade 43 in the part of the cutting planned line, pressed downward, and just bent. This bent amount is smaller than the comparative example 1 since the magnet body 30 and the magnet piece 31 are held from the upper side by the magnet holder 45. Therefore, the generation of the tensile force to separate the coating film 35 on the side of the upper surface of the cut magnet piece 31 and the coating film 35 on the side of the upper surface of the pre-cut magnetic body 30 becomes further weaker, so that the coating film 35 is not drawn out enough to be cut and hence not cut.

Following lifting of the blade 43 after that, in a state where the magnet body 30 and the magnet piece 31 are connected by the uncut coating film 35 on the side of the upper surface, the magnet body and the magnet piece are restored from a bent state by the magnet holder 45 (FIG. 5C).

Thus, in the present embodiment, the cutting step for cutting the magnet body 30 is performed as follows.

FIGS. 6A to 6D are views showing a cutting step by a cutting device 60 according to the present embodiment. The cutting device 60 according to the present embodiment described herein includes a magnet holder 65 adapted to prevent scatter of the magnet piece 31 by stress release at the moment of cutting as well as the comparative example 2. However, as described later, this magnet holder 65 effectively acts on cutting of the coating film 35 but not an essential configuration for the cutting device 60 of the present embodiment.

Figure 6A:
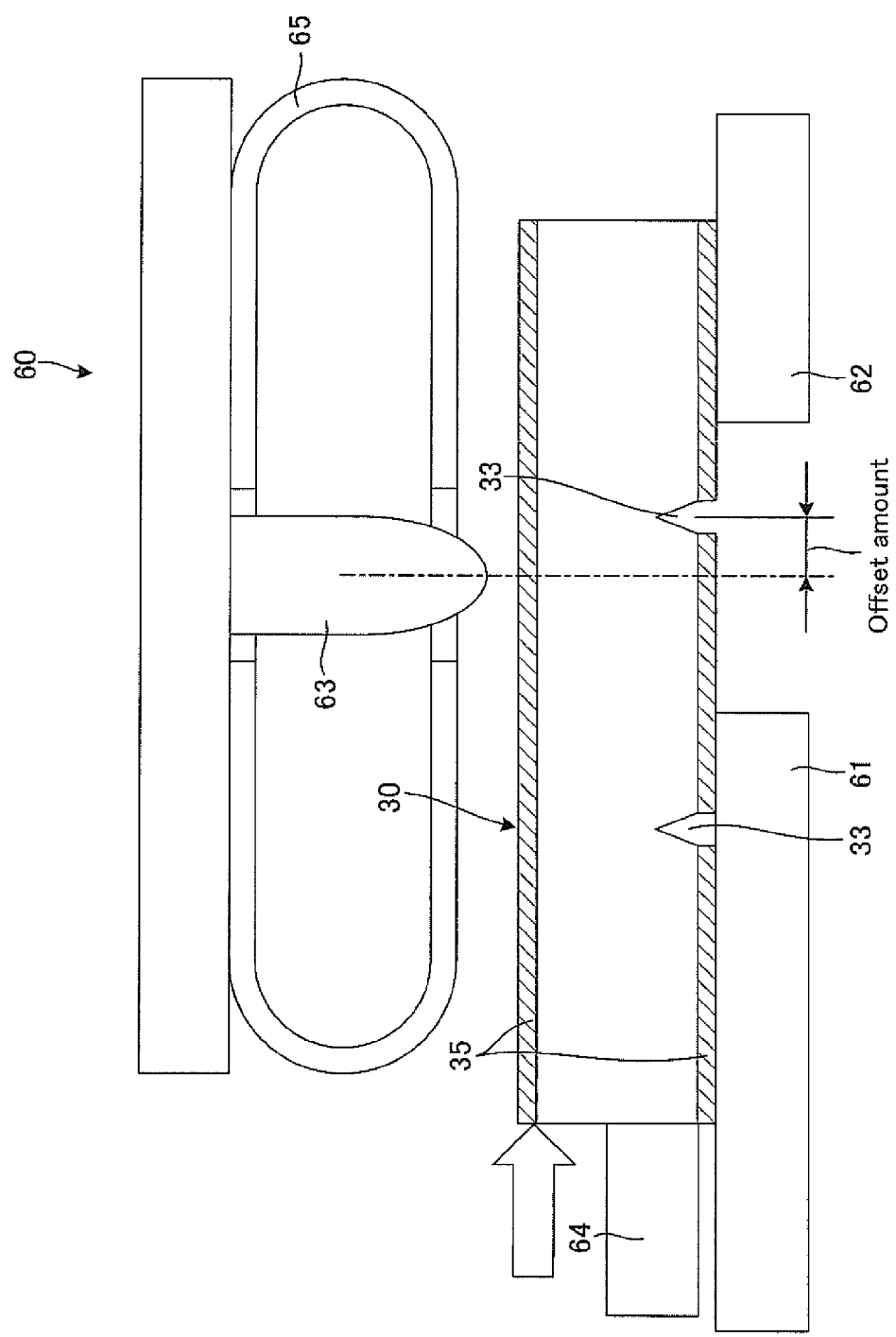
FIG. 6A is a view showing a cutting step of the cutting device according to a first embodiment.

In the present embodiment, firstly, a feeding amount of the magnet body 30 is adjusted in such a manner that a position in the feeding direction of the magnet body 30 mounted on a pair of dies 61, 62 serving as a support section becomes a position where the cutout groove 33 is offset to the leading end side in the feeding direction of the magnet body 30 from an abutment part 73 of a blade 63 (to the right side in the figure) (FIG. 6A). That is, at the time of cutting the magnet body 30, the cutting groove 33 is arranged not immediately below the abutment part 73 of the blade 63 but displaced in the feeding direction of the magnet body 30 by a predetermined offset amount.

The magnet body 30 is conveyed by pushing out the magnet body 30 in the conveying direction by a magnet conveyance device 64 serving as a feeding device/means. The magnet conveyance device 64 is formed by for example a LM guide in which an AC servomotor and ball screws are combined or the like, and is capable of feeding the magnet body 30 in the feeding direction by a predetermined amount and stopping the magnet body at an arbitrary position.

In the present embodiment, the magnet body 30 is arranged in such a manner that the cutout groove 33 of the magnet body 30 is offset to the right side in the figure from the abutment part 73 of the blade 63. An upper limit of the predetermined offset amount is 1 [mm]. By making the upper limit of the offset amount 1 [mm], deterioration of position precision and surface properties of the cut surfaces due to offset of a position of the cutout groove and a blade position can be prevented. The predetermined offset amount is specifically for example about 0.6 [mm]. This offset amount is adjusted by being increased or decreased in accordance with the position precision and the surface properties of the cut surfaces formed between the cut magnet piece 31 and the magnet body 30. A start position of a crack is the cutout groove 33 serving as the brittle section.

Figure 6B:
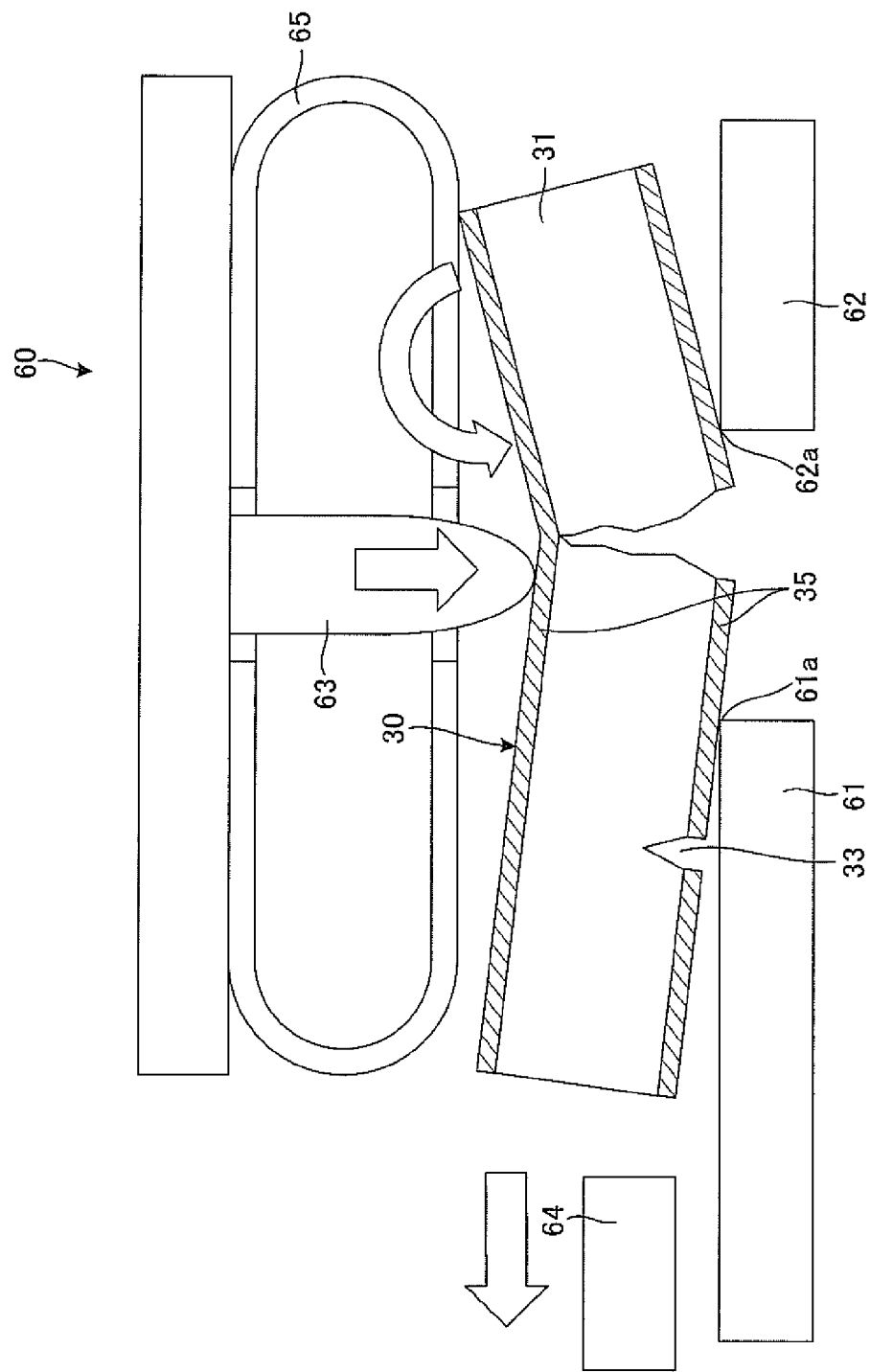
FIG. 6B is a view showing the cutting step of the cutting device according to the first embodiment.

In a state where the magnet body 30 is positioned as described above, the blade 63 is lowered. Following lowering of the blade 63, firstly, the magnet holder 65 is brought into contact with the upper surface of the magnet body 30 to suppress the movement of the magnet body 30. Further, when the blade 63 is lowered, as shown in FIG. 6B, the blade 63 presses the back part of the magnet body 30 offset from the cutout groove 33 downward, and the magnet body 30 is cut along the cutout groove 33 by three-point bending of the blade 63 and adjacent edge sections 61a, 62a of the pair of dies 61, 62 (FIG. 6B). The blade 63 is stopped at a lowering end. Lowering speed of the blade 63 is for example preferably 30 [mm/sec] or higher.

The magnet body 30 immediately after cutting is obliquely inclined with a leading end part in the conveying direction being placed on the lower side in a state where the magnet body is in contact with the lowered blade 63, and the magnet piece 31 cut at a leading end of the magnet body 30 is obliquely inclined with a rear end part in the conveying direction being placed on the lower side. The leading end part in the conveying direction of the magnet body 30 is placed on the front side in the conveying direction of an abutment position of the blade 63. Thus, an up-and-down position of a leading end of the magnet body 30 and a rear end of the magnet piece 31 is lower than the comparative examples 1 and 2. Therefore, an oblique inclination angle of the magnet piece 31 in which the rear end part in the conveying direction is placed on the lower side is also increased. In this state, the coating film 35 of the magnet body 30 and the magnet piece 31 on the leading end side of the magnet body is cut on the side of the side surface of the magnet body 30 and the magnet piece 31 by the cut surfaces generated by the cutout groove 33 but not cut on the side of the upper surface of the magnet body 30.

Figure 6C:
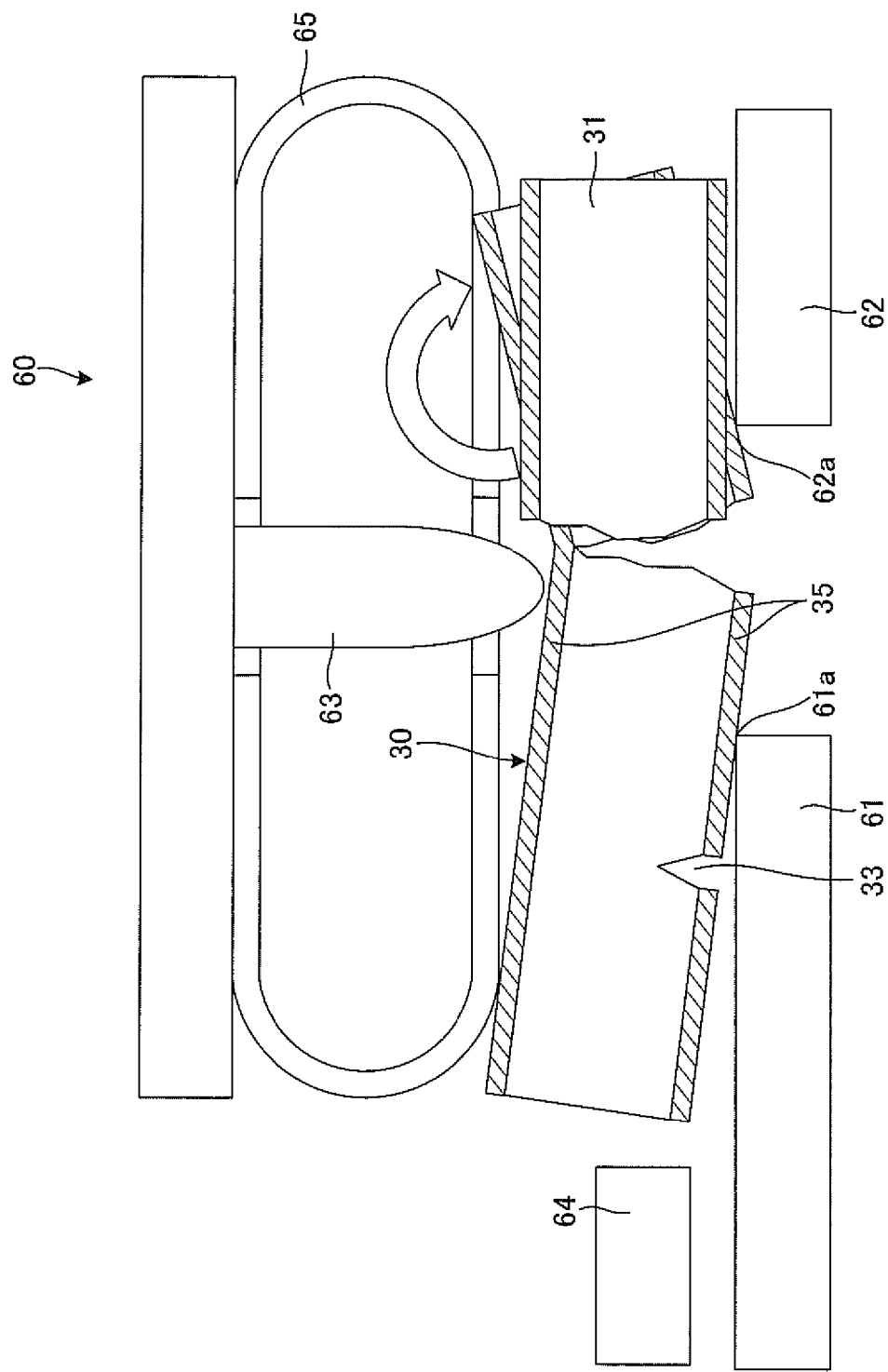
FIG. 6C is a view showing the cutting step of the cutting device according to the first embodiment.

At this time, the rear end of the magnet piece 31 on the leading end side cut from the magnet body 30 is connected to the magnet body 30 whose front end is pushed down by the blade 63 only by the coating film 35 on the upper surface in the cut surface part. The magnet piece is not in contact with the blade 63 and movement thereof is not restricted. Moment to rotate and restore the magnet piece 31 in the arrow direction about the edge section 62a of the die 62 from an inclined posture acts on the magnet piece 31 on the leading end side by self-weight of the magnet piece. This rotating and restoring moment restores the inclined posture of the magnet piece 31 along the die 62 (FIG. 6C). This action of restoring the magnet piece 31 from the inclined posture is made more reliable by displacing the position of the magnet piece forward in the conveying direction before cutting. By holding force by the magnet holder 65, the action of restoring the magnet piece 31 from the inclined posture can be furthermore enhanced.

Thereby, an upper surface rear end part of the magnet piece 31 is moved upward away from an upper surface leading end part of the magnet body 30. By this separation movement, the coating film 35 on the side of the upper surface of the magnet body 30 and the magnet piece 31 is drawn in the separated part, and the coating film 35 on the side of the upper surface coupling the magnet body 30 and the magnet piece 31 is cut and separated in the separated part. Since the up-and-down position of the rear end of the magnet piece 31 is lower than the comparative examples 1 and 2 as described above, an action of drawing the coating film 35 on the side of the upper surface is executed by a large stroke, so that cut and separation of the coating film 35 are reliably executed.

Figure 6D:
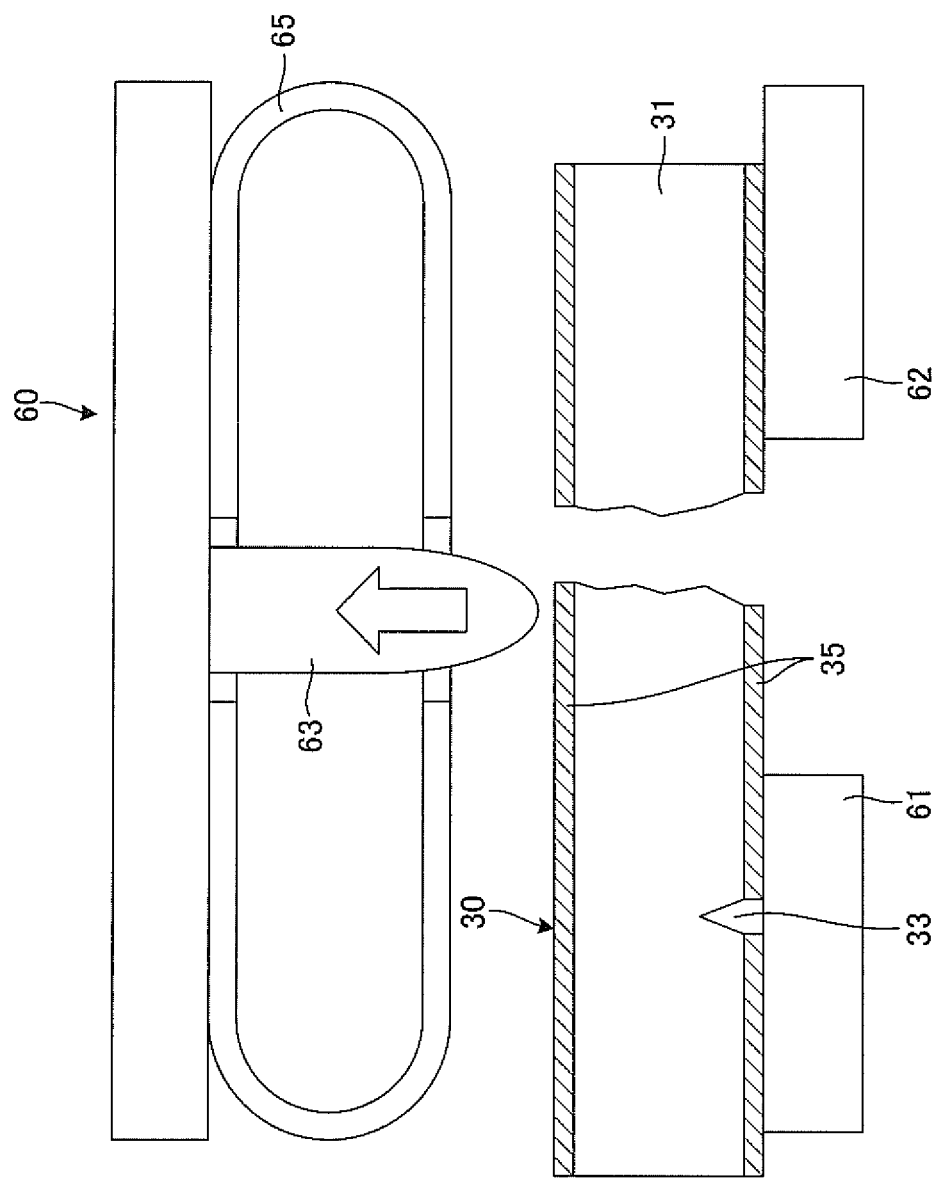
FIG. 6D is a view showing the cutting step of the cutting device according to the first embodiment.

When the blade 63 is lifted up, the magnet body 30 and the magnet piece 31 are completely cut and separated including the coating film 35 (FIG. 6D). For cutting the next magnet piece 31, the magnet body 30 is fed in the feeding direction by a volume of one magnet piece 31 by the magnet conveyance device 64, the magnet piece 31 is cut including the coating film 35 by the same procedure, and the above procedure is repeated for the number of times that cutting is required.

The above rotating and restoring moment generated in the cut magnet piece 31 is increased in proportion to length between the edge section 62a of the die 62 and a front end in the conveying direction of the magnet piece 31. Therefore, in a state where the blade 63 is stopped at the lowering end of the cutting action, the magnet body 30 may be pushed out in the conveying direction by the magnet conveyance device 64 and a position of the magnet piece 31 on the leading end side cut from the magnet body 30 may also be displaced in the conveying direction. In such a way, by displacing the position of the magnet piece 31 on the leading end side in the conveying direction, the length between the edge section 62a of the die 62 and the front end in the conveying direction of the magnet piece 31 can be increased, and the moment to rotate and restore the magnet piece 31 in the arrow direction from the inclined posture to set the magnet piece along the supporting die 62 by the self-weight of the magnet piece can also be increased. Therefore, the action of restoring the magnet piece 31 from the inclined posture can be furthermore enhanced, so that cutting of the coating film 35 can be made furthermore reliable.

In the present embodiment, the following effects are exerted.

(A) By feeding, in a state where the magnet body 30 including the cutout grooves 33 serving as the brittle sections on the lower surface along cutting planned positions is supported by the dies 61, 62 serving as two support points from the lower side, the magnet body 30 to the position where the brittle section is arranged between both the support points, and pressing the magnet body 30 from the upper side of the position offset rearward in the feeding direction from the brittle section between both the support points, the magnet body 30 is cut into the cut magnet body 30 and the magnet piece 31 smaller than the cut magnet body 30 while cutting the coating film 35. That is, by the self-weight of the magnet piece 31, the moment to rotate, restore, and set the magnet piece 31 along the die 62 serving as the support point supporting the magnet piece 31 is generated. Thus, the coating film 35 continuing to the cut magnet body 30 can be cut. There is no need for an additional means adapted to cut the coating film 35. Thus, the cutting device 60 can have a simple configuration.

(B) The cutting step is performed while holding at least the magnet piece 31 among the magnet body 30 and the magnet piece 31 by the magnet holder 65 from the upper side. Thus, the moment to rotate, restore, and set the magnet piece along the die 62 serving as the support point supporting the cut magnet piece 31 can be increased, so that the cutting of the coating film 35 can be made furthermore reliable.

(C) By adding an action of displacing the cut magnet piece 31 in the feeding direction by the magnet conveyance device 64, by the self-weight of the magnet piece, the moment to rotate, restore, and set the magnet piece along the die 62 serving as the support point supporting the magnet piece 31 can be increased, so that the cutting of the coating film 35 can be made furthermore reliable.

(D) The cutout grooves 33 serving as the brittle sections are provided at equal intervals in the feeding direction on at least one surface of the magnet body 30, and the offset amount is the same in the cutting step of all the brittle sections. Therefore, at the time of first cutting, when a positional relationship between the brittle section and the blade 63 is set to obtain optimal position precision and surface properties of the cut surfaces, the magnet body 30 is always constantly conveyed for each cutting action. Thus, a conveying action can be made simple.

(E) The cutout grooves 33 serving as the brittle sections are made by laser beam irradiation. Thus, the position precision of the obtained brittle sections is improved.

The embodiment of the present invention is described above. The above embodiment only shows part of application examples of the present invention but does not intend to limit the technical scope of the present invention to specific configurations of the above embodiment.

The invention claimed is:

1. A cutting method of manufacturing a magnet piece forming a magnet body for field pole to be arranged in a rotating electric machine by cutting a permanent magnet body having a plate shape with a lower surface and an upper surface, comprising:
    forming a brittle section on at least one of the lower surface and the upper surface of the permanent magnet body including a deterioration preventive coating film on a surface at a cutting planned position extending in a width direction of the magnet body;
    in a state where the magnet body having the brittle section being placed on the lower surface is supported at two support points from a lower side, feeding the magnet body to a position where the brittle section is arranged between both the two support points; and
    cutting the magnet body into a cut magnet body and a magnet piece smaller than the cut magnet body including the coating film by pressing the upper surface of the magnet body by a blade at a position offset rearward in a feeding direction from the brittle section between both the support points by a predetermined offset amount, wherein
    the offset amount is such a size that the magnet piece and the blade are not brought into contact with each other at the time of cutting the magnet body into the cut magnet body and the magnet piece.

2. The cutting method according to claim 1, wherein
the cutting is performed while at least the magnet piece among the magnet body and the magnet piece is held from the upper side.

3. The cutting method according to claim 1, wherein
the cutting includes an action of displacing a position of the magnet body in the feeding direction in a state where the magnet body is pressed.

4. The cutting method according to claim 1, wherein
the brittle sections are provided at equal intervals in the feeding direction on at least one of the upper surface and the lower surface of the magnet body, and
the offset amount is the same in the cutting of all the brittle sections.

5. The cutting method according to claim 1, wherein
forming the brittle section is made with laser beam irradiation from a laser irradiation device.

6. A cutting device for manufacturing a magnet piece forming a magnet body for field pole to be arranged in a rotating electric machine by cutting a permanent magnet body having a plate shape with an upper surface and a lower surface, comprising:
   a support section adapted to support the magnet body in which a brittle section is formed on the lower surface along a cutting planned position at two support points from a lower side;
   a feeding device adapted to feed the magnet body to a position where the brittle section is arranged between both the support points; and
   a cutting device adapted to cut the magnet body into a cut magnet body and a magnet piece smaller than the cut magnet body including a coating film of the magnet body by pressing the upper side of the magnet body with a blade at a position offset rearward in a feeding direction from the brittle section between both the support points by a predetermined offset amount, wherein
   the offset amount is such a size that the magnet piece and the blade are not brought into contact with each other at the time of cutting the magnet body into the cut magnet body and the magnet piece, and movement of the magnet piece is not restricted by the blade.

7. The cutting device according to claim 6, wherein
the cutting device includes a magnet holder adapted to hold at least the magnet piece among the magnet body and the magnet piece from the upper side.

8. The cutting device according to claim 6, wherein
the feeding device performs an action of displacing a position of the magnet body in the feeding direction in a state where the magnet body is pressed by the cutting device.

9. The cutting device according to claim 6, wherein
the brittle sections are provided at equal intervals in the feeding direction on at least one of the upper surface and the lower surface of the magnet body, and
the offset amount is the same in cutting of all the brittle sections.

10. The cutting device according to claim 6, further comprising:
    a laser irradiation device for forming the brittle section by laser beam irradiation.

11. A cutting device for manufacturing a magnet piece forming a magnet body for field pole to be arranged in a rotating electric machine by cutting a permanent magnet body having a plate shape with an upper surface and a lower surface, comprising:
    a support section adapted to support the magnet body in which a brittle section is formed on the lower surface along a cutting planned position at two support points from a lower side;
    feeding means for feeding the magnet body to a position where the brittle section is arranged between both the support points; and
    a cutting device having a blade for cutting the magnet body into a cut magnet body and a magnet piece smaller than the cut magnet body including a coating film of the magnet body by pressing the upper side of the magnet body with the blade at a position offset rearward in a feeding direction from the brittle section between both the support points by a predetermined offset amount, wherein
    the offset amount is such a size that the magnet piece and the blade are not brought into contact with each other at the time of cutting the magnet body into the cut magnet body and the magnet piece, and movement of the magnet piece is not restricted by the blade.

* * * * *